Jan. 23, 1940.                D. L. HAY                2,187,739
                    FLUID PRESSURE REDUCING VALVE
                        Filed July 8, 1938        3 Sheets—Sheet 1
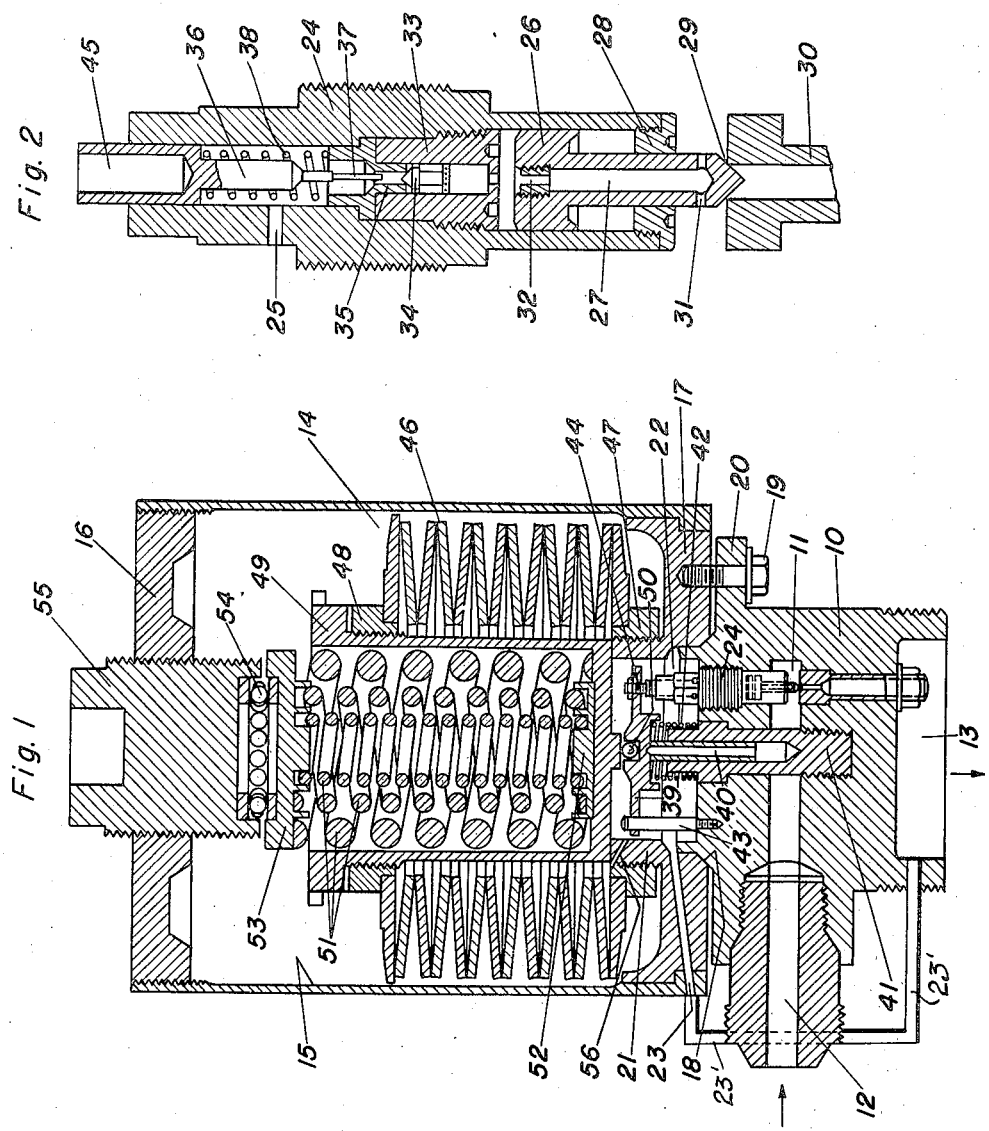
INVENTOR
DONALD L. HAY, DECEASED
BY MATILDA K. HAY, EXECUTRIX
ATTORNEY Jan. 23, 1940.  D. L. HAY  2,187,739
FLUID PRESSURE REDUCING VALVE
Filed July 8, 1938  3 Sheets-Sheet 2
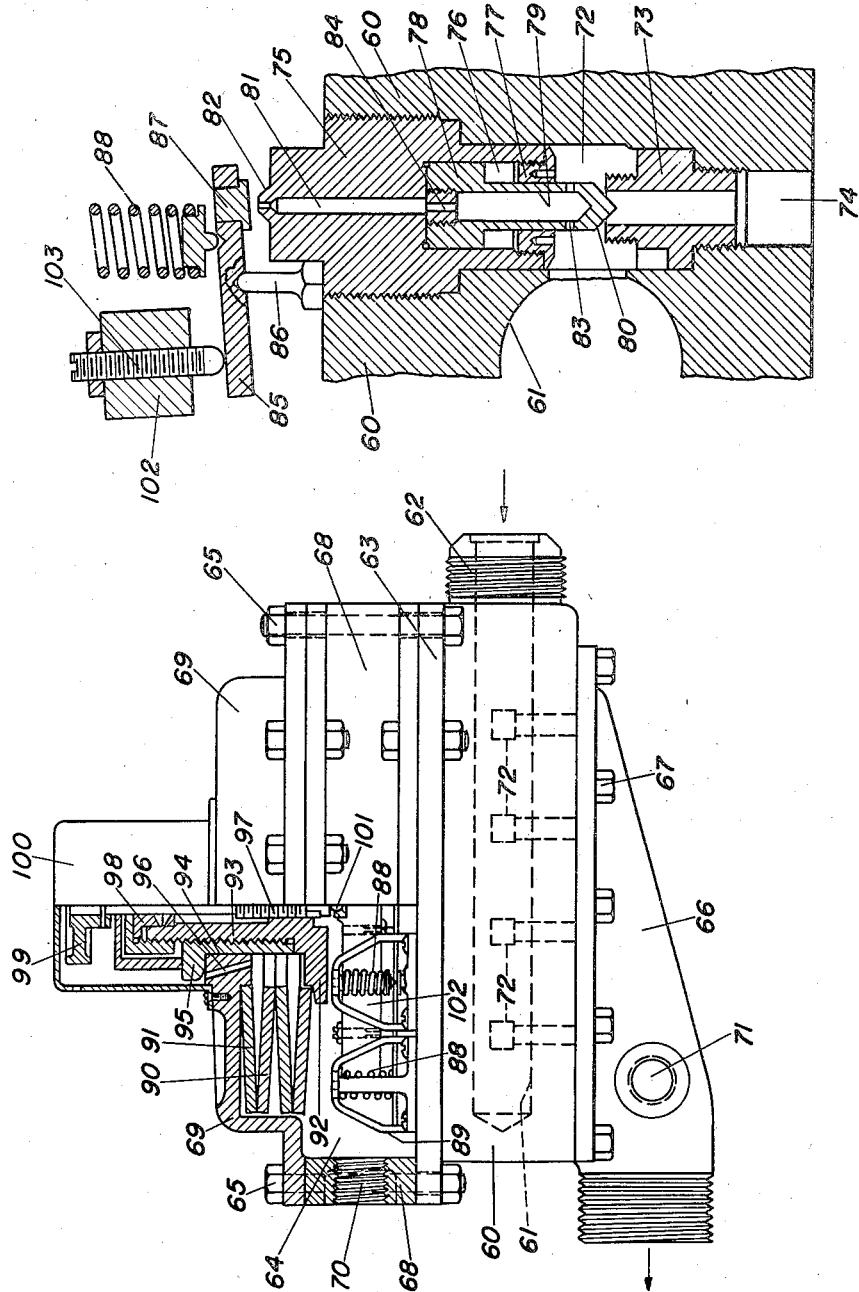
INVENTOR
DONALD L. HAY, DECEASED
BY MATILDA K. HAY, EXECUTRIX
ATTORNEY Jan. 23, 1940.          D. L. HAY          2,187,739
FLUID PRESSURE REDUCING VALVE
Filed July 8, 1938          3 Sheets-Sheet 3
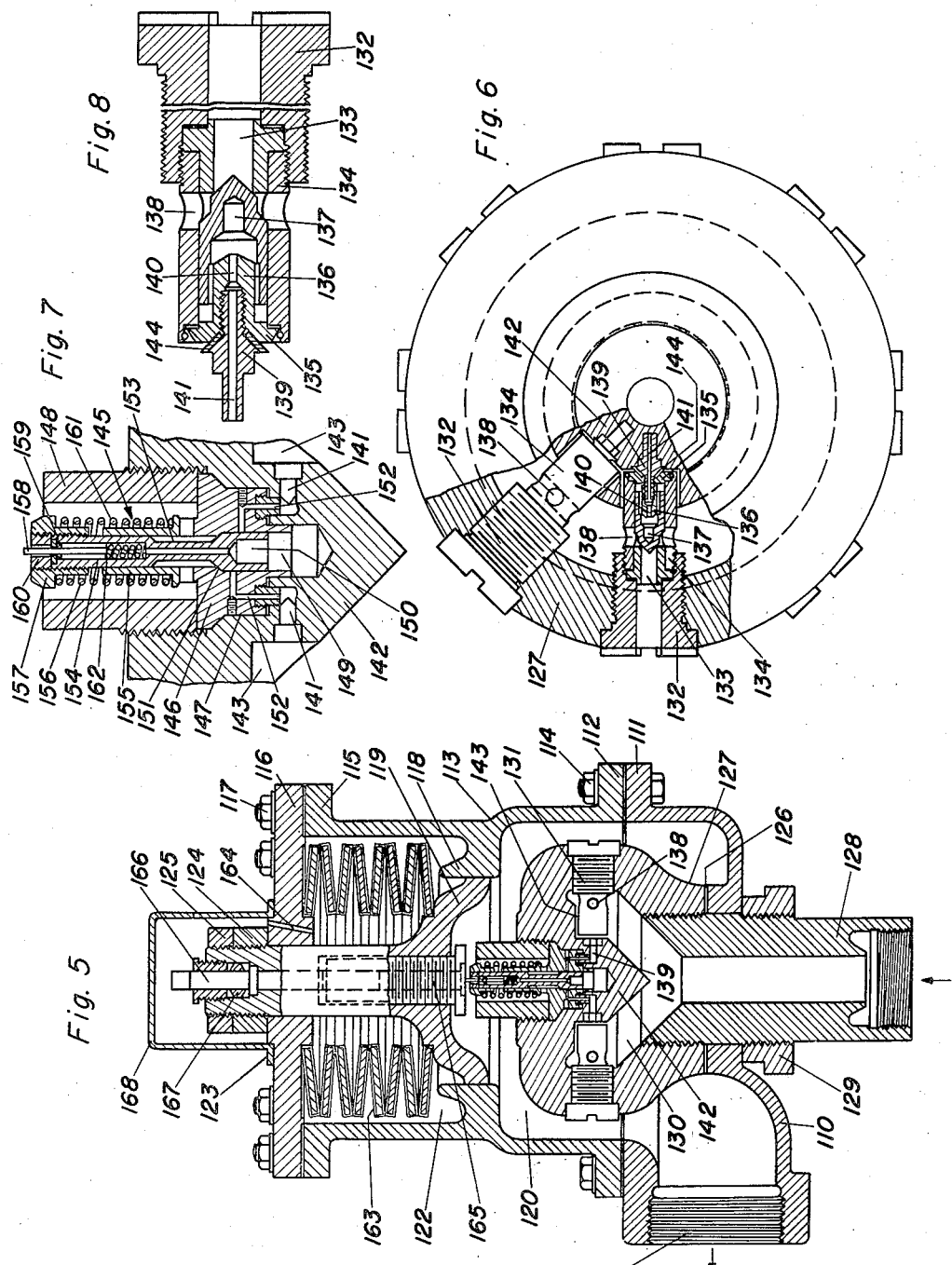
INVENTOR
DONALD L. HAY, DECEASED
BY MATILDA K. HAY, EXECUTRIX
ATTORNEY Patented Jan. 23, 1940

2,187,739

UNITED STATES PATENT OFFICE 2,187,739

FLUID PRESSURE REDUCING VALVE

Donald L. Hay, deceased, late of Washington, D. C., by Matilda K. Hay, executrix, Washington, D. C.

Application July 8, 1938, Serial No. 218,121

11 Claims. (Cl. 50—11)

(Granted under the act of March 3, 1883, as amended April 30, 1928; 370 O. G. 757)

This invention relates to fluid pressure reducing valves and it has a particular relation to pressure reducing valves of the spring loaded type.

One of the objects of the present invention is the provision of a pressure reducing valve of the character described, which will respond quickly and accurately to small variations in pressure, which reduces to a minimum the tendency to chatter and vibrate and which will not freeze during a heavy air delivery.

Another object of the invention is the provision of a valve of the type indicated embodying a plurality of relatively small and light valve units which are operable in sequence with fluctuations in pressure, thus dispensing with the single large valve member usually employed and the tendency for the same to leak and become sluggish.

With these and other objects in view, as well as other advantages that may be incident to the use of the improvements, the invention consists in the parts and combinations thereof hereinafter set forth and claimed, with the understanding that the several necessary elements constituting the same may be varied in proportion and arrangement without departing from the nature and scope of the invention, as defined in the appended claims.

In order to make the invention more clearly understood, there are shown in the accompanying drawings, means for carrying the invention into practical use, without limiting the improvements in their useful application to the particular construction, which, for the purpose of explanation, have been made the subject of illustration.

In the accompanying drawings:

Fig. 1 is a vertical sectional view through one form of fluid pressure reducing valve embodying the invention;

Fig. 2 is an enlarged vertical sectional view through one of the valve units shown in Fig. 1;

Fig. 3 is a view partly in side elevation and partly in vertical section of another form of valve construction in accordance with the invention;

Fig. 4 is an enlarged fragmentary vertical sectional view through one of the individual valve units shown in Fig. 3;

Fig. 5 is a vertical sectional view through still another form of valve embodying the invention;

Fig. 6 is a plan view with parts broken away of the valve structure shown in Fig. 5 and illustrating the individual valve units thereof both in elevation and in longitudinal section;

Fig. 7 is an enlarged vertical sectional view through the pilot valve elements shown in Fig. 5; and Fig. 8 is an enlarged longitudinal sectional view through one of the valve units.

Referring to the drawings, and particularly to Figs. 1 and 2 thereof, a fluid pressure reducing valve constructed in accordance with the invention is shown as comprising a valve body 10 formed with a high pressure chamber 11 communicating with a high pressure opening 12 and at times with a low pressure opening 13 also formed in the body 10. The valve structure also includes a pressure control chamber 14 comprising a cylindrical wall 15, a top plate 16 and a base plate 17, the latter being clamped in sealing engagement upon a circumferential seat 18, formed on the body 10, by means of a plurality of cap screws 19 which pass through a circumferential flange 20 on the body 10 and are screw threaded into the base plate 17. The base plate 17 is formed with an inner circumferential flange 21 defining a low pressure chamber 22 which is at all times in fluid communication with the low pressure opening 13 through a passageway 23 in the base plate 17 and piping 23'.

Arranged in a circle within the low pressure chamber 22 is a plurality of individual valve units, preferably eight in number, each comprising a cylinder 24 wihch is threaded into the valve body 10 and which is provided with a plurality of ports 25 for at times establishing communication between the low pressure chamber 22 and the high pressure chamber 11. Mounted for vertical movement in the lower portion of the cylinder 24 is a piston 26 (Fig. 2) provided with a tubular valve stem 27 which extends downwardly through a head 28 screw threaded into the lower end of the cylinder. The stems 27 of each of the pistons cooperates with a valve seat 29 formed on the upper end of a tubular member 30 which is mounted in the body and which at times establishes communication between the high pressure chamber 11 and the low pressure outlet 13. Communication is also established between the high pressure chamber 11 and the cylinder 24 above the piston 26 through ports 31 formed in the valve stem 27 and a restricted orifice 32 provided in the piston 26. Screw threaded into the intermediate portion of the cylinder 24 is a nipple 33 within which a pilot piston valve 34 is mounted for cooperation with a valve seat 35 located at the top of nipple 33. The pilot valve 34 is opened when the pressure within the low pressure chamber 22 and in the outlet 13 decreases to a predetermined value, as will later be described, so as to establish communication between the space above the piston 26 and the low pressure chamber 22 through the ports 25, by means of a plunger 36 mounted in the upper portion of the cylinder 24. This plunger is provided with a stem 37 at its lower end for engagement with the pilot valve 34 and is biased upwardly by means of a coil spring 38.

Also, located within the low pressure chamber 22 is a circular plate 39 which is fixed to the upper end of a stem 40 mounted for vertical movement in a post 41 threaded into the valve body 10 and is urged upwardly by a coil spring 42 encircling the stem and post. The plate 39 is prevented from rotating about its vertical axis by a plurality of guide pins 43 fixed in the body 10 between the valve units and passing through openings in the plate. The plate 39 carries a plurality of screws 44 which are engageable with sockets 45 formed in the upper ends of the plungers 36 and are adjustable in length so that when the plate 39 is depressed the pilot valves 34 will be opened successively.

Located within the pressure control chamber 14 is a metallic bellows 46 the lower end of which is secured to a ring 47 threaded onto the flange 21 and the upper end of which is secured to a ring 48 threaded onto a cup-shaped spring housing 49. This bellows is the subject of a copending application Serial No. 213,727 filed June 14, 1938. The housing 49 extends downwardly through the bellows 46 and bears against the plate 39 through the medium of a centrally located ball bearing 50 and contains a plurality of concentrically arranged compression springs 51 of varying strength. These springs are confined between retainers 52 and 53, the former being seated in the bottom of the housing 49 and the latter engaging against a thrust bearing 54 interposed between the upper retainer 53 and an adjusting screw 55 threaded into the top plate 16 of the pressure control chamber 14. The interior of the bellows 46 communicates with the low pressure chamber 22 through a port 56 in the flange 21 so that the pressure therein will always be the same.

In operation, let it be assumed that it is desired to effect a reduction from 3000 lbs. per sq. inch pressure in the high pressure supply opening 12 and high pressure chamber 11 to 200 lbs. per sq. inch pressure in the low pressure outlet 13. In this event the adjusting screw 55 is tightened so as to compress the bellows 46 through the medium of the compression springs 51 sufficiently to balance 200 lbs. pressure within the bellows and low pressure chamber 22. That is to say, the fluid pressure within the bellows 46 will maintain the same expanded against the action of the springs 51, thus permitting the spring 42 to hold the plate 39 in its elevated position and the springs 38 to hold the plunger 36 and stem 37 out of contact with the pilot valves 34. The pilot valves 34 will therefore be held closed by fluid under pressure exerted thereagainst and passing from the high pressure chamber 11, through the ports 31, valve stem 27, restricted orifice 32 and nipple 33. This will cause pressure to build up in the space within the cylinder 24 above the piston 26 and hold the valve stem 27 in engagement with its seat 29.

Under these conditions, if the pressure within the low pressure chamber 22 and in the bellows 46 should drop below 200 lbs. per sq. inch, the springs 51 will compress the bellows and move the spring housing 49 downwardly. This movement of the housing will depress the plate 39 and cause one or more of the adjusting screws 44 to, in turn, depress the plungers 36 and stems 37 so as to unseat the pilot valves 34 against the fluid pressure exerted thereagainst. Fluid under pressure is thus permitted to escape from the space above the piston 26, through the nipple 33, around the pilot valve 34, through the valve seat 35 and ports 25 into the low pressure chamber 22, and since the ports 25 are larger than the restricted orifice 32, the pressure above the piston 26 is reduced. This permits the higher pressure, which has built up in the space beneath the piston 26 through leakage past the valve stem 27 while the pilot valve was closed, to elevate the piston 26 and unseat the valve stem 27. Fluid under high pressure is thus permitted to flow from the high pressure chamber 11 to the low pressure outlet 13. As soon, however, as the pressure within the low pressure outlet again builds up to 200 lbs. per sq. inch and this pressure is transmitted to the low pressure chamber 22 through the piping and passageway 23, and thence to the interior of the bellows 46 through the port 56, the bellows is expanded against the action of the springs 51 and elevates the spring housing 49. This permits the spring 42 to elevate the plate 39 and the screws 44 carried thereby so as to allow the springs 38 to raise the plungers 36 and the stems 37 out of contact with the pilot valves 34. The pressure beneath the pilot valves causes them to close, thus causing pressure above the pistons 26 to build up rapidly and force them down and the stems 27 into engagement with their seats 29. The supply of fluid under pressure is thus interrupted until the pressure in the outlet again drops below 200 lbs. to the square inch when the described cycle of operations is repeated.

It will be understood that the pilot valves open successively and in accordance with the adjustments of the screws 44. Hence, if the reduction in pressure is only slight it may be that only one of the main valves will be opened. On the other hand if the reduction in pressure in the low pressure outlet is sudden due to a large demand, several or all of these valves will be opened in rapid sequence so as to replenish the supply of fluid under the desired pressure at a faster rate.

In Figs. 3 and 4 there is illustrated another form of the invention in which the valve in its entirety comprises a block 60 machined from a bar of hot rolled "Everdur" and having a high pressure chamber 61 formed therein which communicates with a source of fluid at high pressure through a nipple 62. The block 60 is formed with an upper flange 63 to which a pressure control chamber 64 is secured by bolts 65. A low pressure or expansion chamber 66 is secured to the lower surface of the block 60 by means of bolts 67. The pressure control chamber 64 comprises a side wall 68 and a cover or cap plate 69 through which the bolts 65 extend and which are clamped together thereby. Communication is at all times maintained between the interior of the pressure control chamber 64 and the low pressure or expansion chamber 66 through ports 70 and 71 formed in the side walls thereof and which are connected by suitable piping, not shown. Communication is at times established between the high pressure chamber 61 and the low pressure or expansion chamber 66 through laterally extending passages 72 (Fig. 4), valve seats 73 and outlet passages 74, arranged in line along each side of the chamber 61, the passages and valve seats on one side of the chamber being offset or staggered with respect to those on the opposite side. There are preferably eight of these passages and valve seats, four on each side of the chamber 61.

Threaded into the block 60 above each of the valve seats 73 is a plug 75 having a cylindrical bore 76 in its lower end closed by a cap or head 77 and in which a piston 78 is mounted for vertical movement. The piston 78 is provided with a hollow stem 79 which extends downwardly through the cap 77 and is formed with a conical valve 80 at its lower end for cooperation with its valve seat 73. Communication is, at times, established between the upper end of the bore 76 above the piston 78 through a vertical passageway 81, the upper end of which terminates in a valve seat 82. Communication is also established between the high pressure chamber 61 and the space above the piston 78 through ports 83 formed in the lower end of the valve stem 79 and a restricted orifice 84 provided in the upper end thereof. The flow of fluid through each of the valve seats 82 and the ports communicating therewith is controlled by a pilot valve mechanism each comprising a lever 85 which is pivotally mounted on the rounded end of a post 86 carried by the block 60 within the pressure control chamber 64 and which carries a valve member 87 for movement into and out of seating engagement with its associated valve seat 82. A spring 88 positioned between the outer end of the lever 85 and a bracket 89 mounted on the block 61 (Fig. 3), biases the valve member 87 toward its closed position.

The levers 85 are depressed from time to time in order to unseat the pilot valves 87 and reduce the pressure holding the main valves 80 closed, by means of a spring bellows 90 located in the pressure control chamber 64. This bellows consists of a plurality of dish shaped discs 91 suitably secured together around their outer edges, the uppermost disc bearing against the cover plate 69 and the lowermost engaging an annular flange 92 provided on the lower end of the tubular stud 93. This stud extends upwardly through the cover plate 69 and has a compression nut 94 screw threaded thereon provided with a head 95 which bears against the upper surface of the cover plate. By means of this construction the bellows 90 may be placed under an initial compression of the desired degree. The interior of the bellows 90 is vented to the outer atmosphere through a port 96 in the cover plate. An adjusting stem 97 is screw threaded into the stud 93 and extends upwardly therethrough and through a packing gland 98 threaded onto the upper end of the stud. The upper end of the stem 97 is provided with an operating handle 99 which is enclosed within a removable cap or cover 100 secured to the top plate 69.

The lower end of the stem 97 is provided with a ball bearing 101 for engagement with a pair of longitudinally extending hinged spreader bars 102 each of which is provided with a plurality of adjustable screws 103 for engagement with the levers 85 (Fig. 4). The screws 103 are screwed into the spreader bars 102 varying distances so that they will engage and depress the levers and unseat the valves 87 in a predetermined sequence.

In the operation of the valve structure shown in Figs. 3 and 4, let it be assumed as before, that the pressure of the fluid in the high pressure chamber 61 is 3000 lbs. to the sq. inch and that the bellows have been initially compressed by the nut 94 between the top plate 69 and the flange 92, so that when the pressure within the pressure control chamber 64, and in the low pressure chamber 66 reaches 200 lbs. per sq. inch, it will be further compressed and elevate the adjusting stem 97. This will permit the spreader bars 102 and levers 85 to hold the valves 87 closed under the action of the springs 88. Under these conditions, if the demand on the low pressure side of the valve should decrease a predetermined amount according to the adjustment of the stem 97 and screws 103, say 2 lbs. per sq. inch, the said reduction in pressure will immediately result in a corresponding reduction of the pressure in the low pressure chamber 64. This will permit the bellows 90 to expand and cause the stem 97 to swing the spreader bars 102 so as to carry one of the screws that projects downwardly the greatest distance therefrom, into engagement with its associated lever 85, thus depressing the same against the action of its spring 88 and unseat the valve 87 carried thereby. The opening of the valve 87 will cause a reduction of the pressure in the bore 76 above the piston 78, thereby allowing the greater pressure of the fluid leaking past the valve stem 79 into the space below the piston 78, to force the latter upwardly and unseat the valve 80.

Fluid under high pressure will thus be permitted to flow from the high pressure chamber 61 into the outlet or expansion chamber 66 until the pressure therein, and in the low pressure chamber 64 again, reaches 200 lbs. per sq. inch. When this occurs the bellows 90 will again be compressed so as to allow the valve 87 to be closed by the spring 88. As soon as the valve 87 is closed the pressure above the piston 78 builds up almost immediately to a higher pressure while the pressure beneath the piston lags at some intermediate pressure, with the result that the piston 78 is forced down closing the valve 80 and interrupting the flow of fluid at high pressure to the outlet or expansion chamber 66.

As in the valve structure described in Figs. 1 and 2, the several valve units operate in sequence so as to accommodate rapidly, small or heavy demands on the low pressure side of the valve.

In Figs. 5, 6 and 7 there is shown a still further embodiment of the invention in which the valve in its entirety comprises a lower casting 110 provided with a flange 111 to which a corresponding flange 112 of an upper casting 113 is secured by bolts 114. The upper casting is formed with an upper flange 115 to which a top plate 116 is secured by bolts 117 and is provided with an internal annular flange 118 intermediate its ends which forms a cylinder in which a piston 119 is mounted for vertical reciprocation. This piston divides the interior of the castings 110 and 113 into a lower outlet or expansion chamber 120 having an outlet 121 and an upper pressure control chamber 122, and is formed with a stud 123 which extends upwardly through the top plate 116 and has an adjusting nut 124 and a lock nut 125 threaded thereon.

Mounted on a seat 126 formed on the lower casting 110 is a main valve block 127 and is secured in position thereon by a high pressure inlet pipe 128 which extends through the seat 126 for threaded engagement with the block 127 and by a nut 129 threaded onto the pipe 128 exterior of the casting 116. The high pressure inlet pipe 128 communicates at its upper end with a high pressure chamber 130 formed in the block 127 and thence through a plurality of valve units, indicated generally at 131 with the low pressure chamber 120.

With reference to Fig. 6, the valve units 131, preferably eight in number, are arranged radially and each comprises a plug 132 which is threaded into the block 127. A valve seat 133 is clamped in a recess formed in the inner end of the plug 132 by a cylinder 134, one end of which is threaded into said recess and the other end of which is closed by a cylinder head 135. The cylinder head 135 is formed with a cylindrical protuberance 136 which extends into one end of a cylindrical valve member 137 which is slidably mounted in the cylinder 134 for engagement with the valve seat 133. A plurality of ports 138 are provided in the cylinder 134 for, at times, establishing communication through the valve seat 133, between the high pressure chamber 130 and the low pressure chamber 120. A tubular nipple 139 is threaded into the cylinder head 135 and communicates with a passageway 140 in the protuberance 136. The other end of the nipple 139 projects into a bore 141 provided in a centrally disposed boss 142 which is formed on the valve block 127 and which projects downwardly into the high pressure chamber 130. The inner end of the cylinder 134 is clamped in a socket 143 formed in the boss 142, by the screw plug 132 and leakage therebetween is prevented by a conical gasket 144 interposed between the cylinder head 135 and the bottom of the socket. When the pressure of the fluid in the low pressure chamber is within the desired pressure range, the valve member 137 is held seated by the pressure of fluid leaking past this valve from the high pressure chamber 130 into the space between the cylinder head 135 and the rear end of the valve.

The high pressure back of the valve is vented in succession in order to allow the higher pressure acting on the front of the same in an opposite direction to unseat the valves, when the pressure in the low pressure chamber falls below a predetermined value, by means of a pilot valve mechanism indicated generally at 145. With particular reference to Fig. 7, this pilot valve mechanism comprises a valve body 146 which is clamped in a central recess 147 formed in the block 127, by a nipple 148 threaded into said recess. The valve body 146 is formed with a cylinder 149 in which a piston valve member 150 is mounted for vertical sliding movement into and out of engagement with a valve seat 151. Communication is, at times, established between the cylinder 149 and the several bores 141 of the individual valve units, through a plurality of passageways 152, having horizontal portions offset vertically with respect to one another, and opening into the cylinder 149 at different levels so that they will be uncovered one at a time as the valve member 150 moves down.

The piston valve 150 is connected by a tubular stem 153 with a cylinder 154 which is mounted for sliding movement in a lower spring retainer 155 carried by the valve body 146. The piston valve 150 is urged upwardly into seating engagement with its seat 151 by a coil spring 156 interposed between the lower retainer 155 and a spring retainer 157 threaded onto the upper end of the cylinder 154. Mounted on a stem 158 within the cylinder 154 is a bleed valve member 159 which is urged toward a valve seat 160 threaded into the upper spring retainer 157, by a spring 161 interposed between the bottom of the cylinder 154 and a follower 162 fixed to the lower end of the stem 158. The stem 158 extends a short distance above the bleed valve 159 and loosely through the valve seat 160, for a purpose presently to be described.

Located within the pressure control chamber 122 is a metallic bellows 163, similar to those hereinbefore described. This bellows is placed under the desired initial compression by means of the compression unit 124, its interior being vented to the outer atmosphere through a port 164 in the top plate 116. An adjusting screw 165 is threaded into the lower surface of the piston 119 for engagement with the bleed valve stem 158 and the upper spring retainer 160, and may be rotated to adjust the distance it extends below the piston by a rod 166. This rod is fixed to the upper end of the screw 165 and extends upwardly through the stud 123 and a packing gland 167 carried thereby to a point where it is accessible for adjustment. The end of the rod 166 and the nuts 124 and 125 are enclosed within a removable cover 168 secured to the top plate 116.

In the operation of the valve structure just described, let it again be assumed that the fluid pressure in the inlet pipe 128 and in the high pressure chamber 130 is 3000 lbs. per sq. inch and that the pressure within the low pressure chamber 120 and the pressure control chamber 122 is 200 lbs. per sq. inch, the pressure to which the spring bellows 163 is adjusted. Under these conditions the bellows 163 will be compressed by the piston 119 as well as by fluid under pressure leaking past the piston so as to hold the adjusting screw 165 out of engagement with the bleed valve stem 158 and the upper spring retainer 160. This permits the spring 161 to hold the bleed valve 159 closed so that fluid under high pressure will build up through leakage back of the piston valve 150 and hold this valve also closed. This same pressure will also hold the valve 137 in a closed position, as hereinbefore explained, so as to interrupt communication between the high pressure chamber 130 and the low pressure chamber 120.

If, now, the demand on the low pressure side of the system should cause the pressure within the low pressure chamber to decrease a predetermined amount, say 2 lbs. per sq. inch, the spring bellows 163 will expand and cause the adjusting screw 165 to depress the stem 158 and open the bleed valve 159. This will permit the fluid under high pressure to escape from the space behind the piston valve 150 through the tubular stem 153 and valve seat 160 into the low pressure chamber 120 at a rate faster than it can leak into this chamber. The volume of fluid thus suddenly released from the chamber is negligible as compared with that on the outlet side of the valve and therefore does not appreciably affect the pressure thereof. The adjusting screw 165 in its descent next engages the spring retainer 157 and forces it, the cylinder 154, and the piston valve 150 connected thereto, downwardly against the action of the spring 156, the pressure behind the valve 150 having been relieved by the opening of the bleed valve 159. Were it not for the bleed valve 159, the bellows 163, which expands at pressures below 200 lbs. per sq. inch, could not overcome the pressure of 3000 lbs. per sq. inch gradually built up through leakage in the cylinder 149. As the piston valve 150 moves downwardly it will first uncover the uppermost of the passageways 152, thereby also permitting the escape to the low pressure chamber 120, of the fluid under high pressure which is confined back of the piston valve 137 of the valve unit 131 in communication with this uppermost passageway. This will permit fluid under high pressure within the high pressure chamber 130 to unseat the valve 137 and flow into the low pressure chamber 120 through the ports 138, valve seat 133 and screw plug 132.

As soon as the fluid pressure within the low pressure chamber 120 and in the pressure control chamber 122 has again built up to 200 lbs. per sq. inch the bellows 163 will be collapsed sufficiently to raise the adjusting screw 165, thereby permitting the spring 156 to close the piston valve 150 and the spring 161 to close the bleed valve 159. Fluid under high pressure will now leak past the valves 137 and 150 and build up back of these valves sufficiently to close the former and maintain the latter closely seated on its seat 151. This interrupts the flow of fluid under high pressure to the low pressure chamber 120. As in the valve structures previously described, if the demand on the low pressure side of the system is large, the piston valve 150 will be depressed a great amount so as to uncover a sufficient number of the passageways 152 and actuate the associated valves 137 to accommodate such increased demand.

It will be understood that the above description and accompanying drawings comprehend only the general and preferred embodiment of the invention and that various changes in construction, proportion and arrangement of the parts may be made within the scope of the appended claims without sacrificing any of the advantages of the invention.

The invention described herein may be manufactured and/or used by or for the Government of the United States of America for governmental purposes without the payment of any royalties thereon or therefor.

What is claimed is:

1. A fluid pressure reducing valve comprising a high pressure chamber adapted to be communicably connected with the high pressure side of a fluid pressure system, a low pressure chamber adapted to be communicably connected with the low pressure side of said system, a plurality of main valve units for controlling communication between said chambers, pilot valve means for controlling the operation of said main valve units and means responsive to the pressure of the fluid in said low pressure chamber for actuating said pilot valve means in sequence.

2. A fluid pressure reducing valve comprising a high pressure chamber adapted to be communicably connected with the high pressure side of a fluid pressure system, a low pressure chamber adapted to be communicably connected with the low pressure side of said system, a plurality of main valve units operable by the pressure of the fluid in said high pressure chamber for controlling communication between said chamber, pilot valve means for controlling successively the operation of said main valve units, and means responsive to the pressure of the fluid in said low pressure chamber for operating said pilot valve means.

3. A fluid pressure reducing valve comprising a high pressure chamber adapted to be communicably connected with the high pressure side of a fluid pressure system, a low pressure chamber adapted to be communicably connected with the low pressure side of said system, a plurality of main valve units operable by the pressure of the fluid in said high pressure chamber for controlling communication between said chambers, pilot valve means for controlling successively the operation of said main valve units, and a bellows responsive to the pressure of the fluid in said low pressure chamber for operating said pilot valve means.

4. A fluid pressure reducing valve comprising a high pressure chamber adapted to be communicably connected with the high pressure side of a fluid pressure system, a low pressure chamber adapted to be communicably connected with the low pressure side of said system, a plurality of main valve units operable by the pressure of the fluid in said high pressure chamber for controlling communication between said chambers, a pilot valve for controlling the operation of each of said main valve units, and means responsive to the pressure of the fluid in said low pressure chamber for operating said pilot valves in sequence.

5. A fluid pressure reducing valve comprising a high pressure chamber adapted to be communicably connected with the high pressure side of a fluid pressure system, a low pressure chamber adapted to be communicably connected with the low pressure side of said system, a plurality of main valve units operable by the pressure of the fluid in said high pressure chamber for controlling communication between said chambers, a pilot valve for controlling the operation of each of said main valve units, and a spring loaded bellows responsive to the pressure of the fluid in said low pressure chamber for operating said pilot valves in sequence.

6. A fluid pressure reducing valve comprising a high pressure chamber adapted to be communicably connected with the high pressure side of a fluid pressure system, a low pressure chamber adapted to be communicably connected with the low pressure side of said system, a plurality of main valve units operable by the pressure of the fluid in said high pressure chamber for controlling communication between said chambers, a single pilot valve for controlling successively the operation of said main valve units, and means responsive to the pressure of the fluid in said low pressure chamber for operating said pilot valve means.

7. A fluid pressure reducing valve comprising a high pressure chamber adapted to be communicably connected with the high pressure side of a fluid pressure system, a low pressure chamber adapted to be communicably connected with the low pressure side of said system, a plurality of main valve units operable by the pressure of the fluid in said high pressure chamber for controlling communication between said chambers, pilot valve means for controlling successively the operation of said main valve units, bleed valve means for controlling the operation of said pilot valve means, and means responsive to the pressure of the fluid in said low pressure chamber for operating successively said bleed valve means and said pilot valve means.

8. A fluid pressure reducing valve comprising a high pressure chamber adapted to be communicably connected with the high pressure side of a fluid pressure system, a low pressure chamber adapted to be communicably connected with the low pressure side of said system, a plurality of main valve units operable by the pressure of the fluid in said high pressure chamber for controlling communication between said chambers, a single pilot valve for controlling successively the operation of said main valve units, a bleed valve for controlling the operation of said pilot valve, and means responsive to the pressure of the fluid in said low pressure chamber for operating successively said bled valve and said pilot valve.

9. A fluid pressure reducing valve comprising a high pressure chamber adapted to be communicably connected with the high pressure side of a fluid pressure system, a low pressure chamber adapted to be communicably connected with the low pressure side of said system, a plurality of radially extending main valve units operable by the pressure of the fluid in said high pressure chamber for controlling communication between said chambers, a single pilot valve for controlling successively the operation of said main valve units, bleed valve means for controlling the operation of said pilot valve, and means responsive to the pressure of the fluid in said low pressure chamber for operating successively said bleed valve and said pilot valve.

10. A fluid pressure reducing valve comprising a high pressure chamber adapted to be communicably connected with the high pressure side of a fluid pressure system, a low pressure chamber adapted to be communicably connected with the low pressure side of said system, a plurality of radially extending main valve units operable by the pressure of the fluid in said high pressure chamber for controlling communication between said chambers, a single pilot valve for controlling successively the operation of said main valve units, a bleed valve disposed within said pilot valve for controlling the operation of said pilot valve, and means responsive to the pressure of the fluid in said low pressure chamber for operating successively said bleed valve and said pilot valve.

11. A fluid pressure reducing valve comprising a high pressure chamber adapted to communicably connected with the high pressure side of a fluid pressure system, a low pressure chamber adapted to be communicably connected with the low pressure side of said system, a plurality of main valve units operable by the pressure of the fluid in said high pressure chamber for controlling communication between said chambers, pilot valve means for controlling successively the operation of said main valve units, bleed valve means for controlling the operation of said pilot valve means, and bellows means responsive to the pressure of the fluid in said low pressure chamber for operating successively said bleed valve means and said pilot valve means.

MATILDA K. HAY.
*Executrix of the Estate of Donald L. Hay, Deceased.*